US008449657B2

(12) United States Patent
Son et al.

(10) Patent No.: US 8,449,657 B2
(45) Date of Patent: May 28, 2013

(54) CONTINUOUS DROPLET GENERATOR DEVICES AND METHODS

(75) Inventors: Sang Young Son, Cincinnati, OH (US); Jae Yong Lee, Cincinnati, OH (US); James Lockey, New Richmond, OH (US); Grace LeMasters, New Richmond, OH (US)

(73) Assignee: University of Cincinnati, Cincinnati, OH (US)

( * ) Notice: Subject to any disclaimer, the term of this patent is extended or adjusted under 35 U.S.C. 154(b) by 618 days.

(21) Appl. No.: 12/689,520

(22) Filed: Jan. 19, 2010

(65) Prior Publication Data

US 2010/0180765 A1 Jul. 22, 2010

Related U.S. Application Data

(60) Provisional application No. 61/145,398, filed on Jan. 16, 2009, provisional application No. 61/145,381, filed on Jan. 16, 2009.

(51) Int. Cl.
*B01D 53/00* (2006.01)

(52) U.S. Cl.
USPC ................................ 95/288; 392/394; 356/37

(58) Field of Classification Search
USPC ................ 95/288; 392/386, 394, 397; 356/37
See application file for complete search history.

(56) References Cited

U.S. PATENT DOCUMENTS

| | | | |
|---|---|---|---|
| 4,293,217 | A | 10/1981 | Bird, Jr. et al. |
| 4,449,816 | A | 5/1984 | Kohsaka et al. |
| 4,790,650 | A | 12/1988 | Keady |
| 5,011,281 | A | 4/1991 | Harris |
| 5,026,155 | A | 6/1991 | Ockovic et al. |
| 5,103,212 | A | 4/1992 | Notarianni et al. |
| 5,239,356 | A | 8/1993 | Hollander et al. |
| 5,675,405 | A | 10/1997 | Schildmeyer et al. |

(Continued)

FOREIGN PATENT DOCUMENTS

| | | |
|---|---|---|
| KR | 100763814 B1 | 10/2007 |

OTHER PUBLICATIONS

R. Leaithch and W.J. Megaw, The Diffusion Tube; A Cloud Condensation Nucleus Counter for Use Below 0.3% Supersaturation, Journal of Aerosol Science, vol. 13, No. 4, pp. 297-319, 1982.
G. C. Roberts and A. Nenes, A Continuous-Flow Streamwise Thermal-Gradient CCN Chamber for Atmospheric Measurements, Aerosol Science adn Technology, 39:206-221, 2005.

(Continued)

*Primary Examiner* — Robert A Hopkins
(74) *Attorney, Agent, or Firm* — Dinsmore & Shohl LLP (57) ABSTRACT

Continuous droplet generators and methods are provided. In one embodiment, a continuous droplet generator includes an outer housing that defines a working liquid reservoir configured to maintain a working liquid. The continuous droplet generator also includes one or more heaters configured to change the phase of the working liquid and an evaporation-condensation tube positioned at least partially within the outer housing. The evaporation-condensation tube includes a gas inlet configured to receive a particle-containing gas flow, a gas outlet configured to export generated condensed droplets, a wall, an outer wall surface configured to be in contact with the working liquid, and an inner wall surface in contact with the particle-containing gas flow. The vapor is transported to the particle-containing gas flow through the evaporation-condensation tube by diffusion and vapor pressure difference to increase a relative humidity and grow particles within the particle-containing gas flow by nuclei heterogeneous condensation.

43 Claims, 9 Drawing Sheets

U.S. PATENT DOCUMENTS

| | | | |
|---|---|---|---|
| 5,872,622 | A | 2/1999 | Schildmeyer et al. |
| 5,903,338 | A | 5/1999 | Mavliev et al. |
| 6,469,780 | B1 | 10/2002 | McDermott et al. |
| 6,712,881 | B2 | 3/2004 | Hering et al. |
| 6,980,284 | B2 | 12/2005 | Ahn et al. |
| 2006/0126056 | A1 | 6/2006 | Roberts |
| 2006/0158640 | A1 | 7/2006 | Molter et al. |
| 2008/0083274 | A1 | 4/2008 | Hering et al. |

OTHER PUBLICATIONS

Susanne V. Hering and Mark R. Stolzenburg. A Method for Particle Size Amplification by Water Condensation in a Laminar, Thermally Diffusive Flow, Aerosol Science and Technology, 39:428-436, 2005.

Susanne V. Herring, Mark R. Stolzenburg, Frederick R. Quant, Derek R. Oberreit, and Patricia B. Keady, A Laminar-Flow, Water-Based Condensation Particle Counter (WCPC), Aerosol Science adn Technology, 39:659-672, 2005.

CONTINUOUS DROPLET GENERATOR DEVICES AND METHODS

CROSS REFERENCE TO RELATED APPLICATIONS

This patent application claims priority to U.S. Provisional Patent Application No. 61/145,398 entitled "Small Scale Nanoparticle Size Amplification Device and Method," and U.S. Provisional Patent Application No. 61/145,381 entitled "Swirl Type Hybrid Condensation Particle Counter," the entirety of which are incorporated herein by reference.

TECHNICAL FIELD

Embodiments of the present disclosure generally relate to continuous droplet generators and methods thereof and, more particularly, to continuous droplet generators that are isolated from external forces and are capable of being worn by a user.

BACKGROUND

The condensation particle counter (CPC), often known as condensation nucleus counter (CNC), is an instrument used for the measurement of submicron particles suspended in air. This instrument may utilize a droplet generator to grow small size particles into larger size droplets by the condensation of vapor-phase molecules onto the particle surface so that the particles may be optically detected. Thus, the CPC must create a supersaturated gas stream to effectuate the formation of the larger droplets. One technique to generate the supersaturated gas stream is to provide a condensation tube having a wetted inner wall made from a wicking material that is saturated with water or other working liquids. The inner wall is then heated to phase-change the water into a vapor to create the supersaturated gas stream. However, the use of a wetted wall presents particular disadvantages. For example, external forces such as shaking or mechanical shock causes the water or working liquid to enter the condensation tube as a liquid rather than a vapor. Additionally, due to the wicking nature of the inner wall, current CPCs using a wetted wall may only be effectively operated in an upward orientation, and the size of current CPCs is too large to be comfortably worn by a user.

Accordingly, alternative continuous droplet generators and methods thereof are desired.

SUMMARY

In one embodiment, a continuous droplet generator includes an outer housing that defines a working liquid reservoir configured to maintain a working liquid. The continuous droplet generator also includes one or more heaters configured to change the phase of the working liquid and an evaporation-condensation tube positioned at least partially within the outer housing. The working liquid surrounds the evaporation-condensation tube. The evaporation-condensation tube includes a gas inlet configured to receive a particle-containing gas flow, a gas outlet configured to export generated condensed droplets, a wall, an outer wall surface configured to be in contact with the working liquid, and an inner wall surface configured to be in contact with the particle-containing gas flow. The continuous droplet generator transports vapor to the particle-containing gas flow through the evaporation-condensation tube by diffusion and vapor pressure difference to increase a relative humidity of the particle-containing gas flow to grow particles within the particle-containing gas flow by nuclei heterogeneous condensation.

In another embodiment, a method of increasing a relative humidity level of a particle-containing gas flow to generate continuous droplets includes passing a particle-containing gas flow through an evaporation-condensation tube. The evaporation-condensation tube is made of a hydrophobic material having a pore structure and has an inner wall surface that is non-wetting. The method further includes applying a working liquid to an outer wall surface of the evaporation-condensation tube and heating the working fluid to initiate a phase change of the working liquid to a vapor at the outer wall surface of the evaporation-condensation tube. The pore structure of the hydrophobic material is operable to transport the vapor to the particle-containing gas flow.

In yet another embodiment, a continuous droplet generator includes an outer housing, at least one heater and an evaporation-condensation tube. The outer housing defines a working liquid reservoir configured to maintain a working liquid and the heater is configured to change the phase of the working liquid. The evaporation-condensation tube is positioned at least partially within the outer housing and includes a gas inlet configured to receive a particle-containing gas flow, a gas outlet configured to export generated condensed droplets, an outer wall surface configured to be in contact with the working liquid, and an inner wall surface configured to be in contact with the particle-containing gas. The evaporation-condensation tube also includes a hydrophobic material having a pore structure operable to provide a capillary force such that the continuous droplet generator operates independent of an orientation of the evaporation-condensation tube and of an externally applied force characterized by up to about ±980 m/sec$^2$ or about 2π/10 rad/sec angular velocity. The continuous droplet generator is operable to transport vapor to the particle-containing gas flow through the evaporation-condensation tube by diffusion and vapor pressure difference, thereby increasing a relative humidity of the particle-containing gas flow to grow particles within the particle-containing gas flow by nuclei heterogeneous condensation.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Reference will now be made in detail to aspects of various embodiments of the present disclosure, examples of which are illustrated in the accompanying drawings, wherein like reference numerals refer to the like elements throughout.

The embodiments described herein generally relate to condensation droplet generator devices and methods that may be used in conjunction with a condensation particle counter (CPC) or other devices that may require a particle, compound, biological agent and/or other small articles to be enlarged for detection and/or analysis. More particularly, embodiments described herein are directed to condensation droplet generator devices that are of a reduced size and may be substantially immune to external forces (e.g., physical activity of a user, rotation of the device orientation, etc.) by the use of an enhanced nuclei heterogeneous condensation process via enlarged effective evaporation areas and increased capillary forces. Because the condensation droplet generator devices of the embodiments described herein are significantly immune to external forces and are small in size, they may be worn by a user as part of a personal particle, chemical or biological agent detection system. In some embodiments, the condensation droplet generator devices and CPC of the embodiments described herein may be incorporated into larger systems capable of other functions, such as a global positioning system, for example. Condensation droplet generator devices and methods will be described in more detail herein.

Referring initially to FIG. 1, a condensation droplet generator device 100 according to one embodiment is illustrated. The illustrated embodiment generally comprises an outer housing 101 that defines a working liquid reservoir 102, an evaporation-condensation tube 106, and one or more heaters 114. The working liquid reservoir 102 is positioned between the outer wall surface 109 of the wall 107 of the evaporation-condensation tube 106 and the inner surface of the outer housing 101. The working liquid reservoir 102 is configured to maintain the working liquid 103, which may be water, any organic compound in which a hydroxyl group is bound to a carbon atom of an alkyl or substituted alkyl group including but not limited to isopropyl alcohol, butyl alcohol, methyl alcohol, ethyl alcohol, or any combination of water and such organic compounds. The working liquid reservoir 102 may be configured to surround the evaporation-condensation tube 106 coaxially. Although not illustrated in the figures, embodiments described herein may also include a saturator section prior to the heated evaporation-condensation tube 106 by which the particle-containing gas flow 110 may be conditioned to a specified temperature and saturation ratio before entering the evaporation-condensation tube 106.

In the embodiment illustrated in FIG. 1, the working liquid reservoir 102 comprises a working liquid inlet 104 and working liquid outlet 105 that circulate the working liquid 103 to refill and control the temperature of the working liquid reservoir 102 such that the temperature of evaporation-condensation tube wall 107 may be controlled. It should be understood that more than one working liquid inlet and outlet may be utilized. In the exemplary embodiment illustrated in FIG. 2, the working liquid reservoir 102 comprises a working liquid inlet 104 to fill the working liquid reservoir 102 with working liquid 103 and pressure regulating port 115. The pressure regulating port 115 is operable to open toward the ambient air for regulating the internal pressure of working liquid reservoir 102 at atmospheric pressure. This pressure regulating port 115 may be configured to prevent the working liquid 103 from flowing out of the working liquid reservoir 102 and also allow ambient air to enter the working liquid reservoir 102.

Referring to FIGS. 1 and 2, the illustrated evaporation-condensation tube 106 comprises a wall 107, gas inlet 111, and gas outlet 113. The wall 107 may be of any suitable geometry, such as cylindrical or rectangular, for example, and may have a thickness between about 0.5 micrometers and 5 centimeters. The evaporation-condensation tube wall 107 is configured to not only provide a separation between the working liquid 103 maintained within the working liquid reservoir 102 and a path for particle-containing gas flow 110, but also to transport a vapor formed from the working liquid 103 to the particle-containing gas flow 110 via diffusion and vapor pressure difference. As described in more detail below, the working liquid 103 is phase-changed into vapor by evaporation generated by the heater 114 at the outer wall surface 109. The vapor is then delivered toward the evaporation-condensation tube 106 because the vapor pressure and vapor concentration are higher than those of the particle-containing gas flow 110, as described in more detail below.

The gas inlet 111 is configured to induce the particle-containing gas flow 110 into the evaporation-condensation tube 106. As described above, the particle-containing gas flow 110 may include any number of various particles, such as diesel particles, microbes, or chemical compounds, for example. The carrier of the particle-containing gas flow 110 may be a gas such as air or nitrogen, for example. Air is defined herein as the environmental atmosphere. The particle-containing gas flow 110 may be continuously drawn into the gas inlet 111 by any means. As an example and not a limitation, a suction pump (not shown) may be utilized to draw particle-containing air into the gas inlet 111. As the particle-containing gas flow 110 traverses the evaporation-condensation tube 106, condensed droplets are formed upon the particles (see 116, 116', 116", and 116'" of FIG. 3) which then exit the evaporation-condensation tube 106 at the gas outlet 113 on a continuous basis. The gas outlet 113 can be connected with the external sensing device (not shown) for analyzing generated droplets (e.g., a particulate filter, a particle collector, a particle counter, a particle analyzer, a chemical analyzer, a bio-marker analyzer, or a bio-species analyzer). The external sensing device may be in communication with an additional system or subsystem by wireless or wired communication. For example, the external sensing device may be communicably coupled to a remote computer by a wireless network such as a cellular network, a satellite communications network, and the like.

In the embodiment illustrated in FIGS. 1 and 2, a condensation droplet generator device 100 and 200 also comprises one or more particle-free gas inlet ports 112 that filter the incoming gas flow to prevent particles from entering the evaporation-condensation tube 106 through the particle-free gas inlet port 112. The particle-free gas flow (i.e., a filtered gas flow) may act as a sheath that coaxially surrounds the particle-containing gas flow. The particle-free gas flow may be provided to minimize particle loss produced by the sticking of particles within the particle-containing gas flow 110 to the inner wall surface 108 of the evaporation-condensation tube 107.

Figure 1:
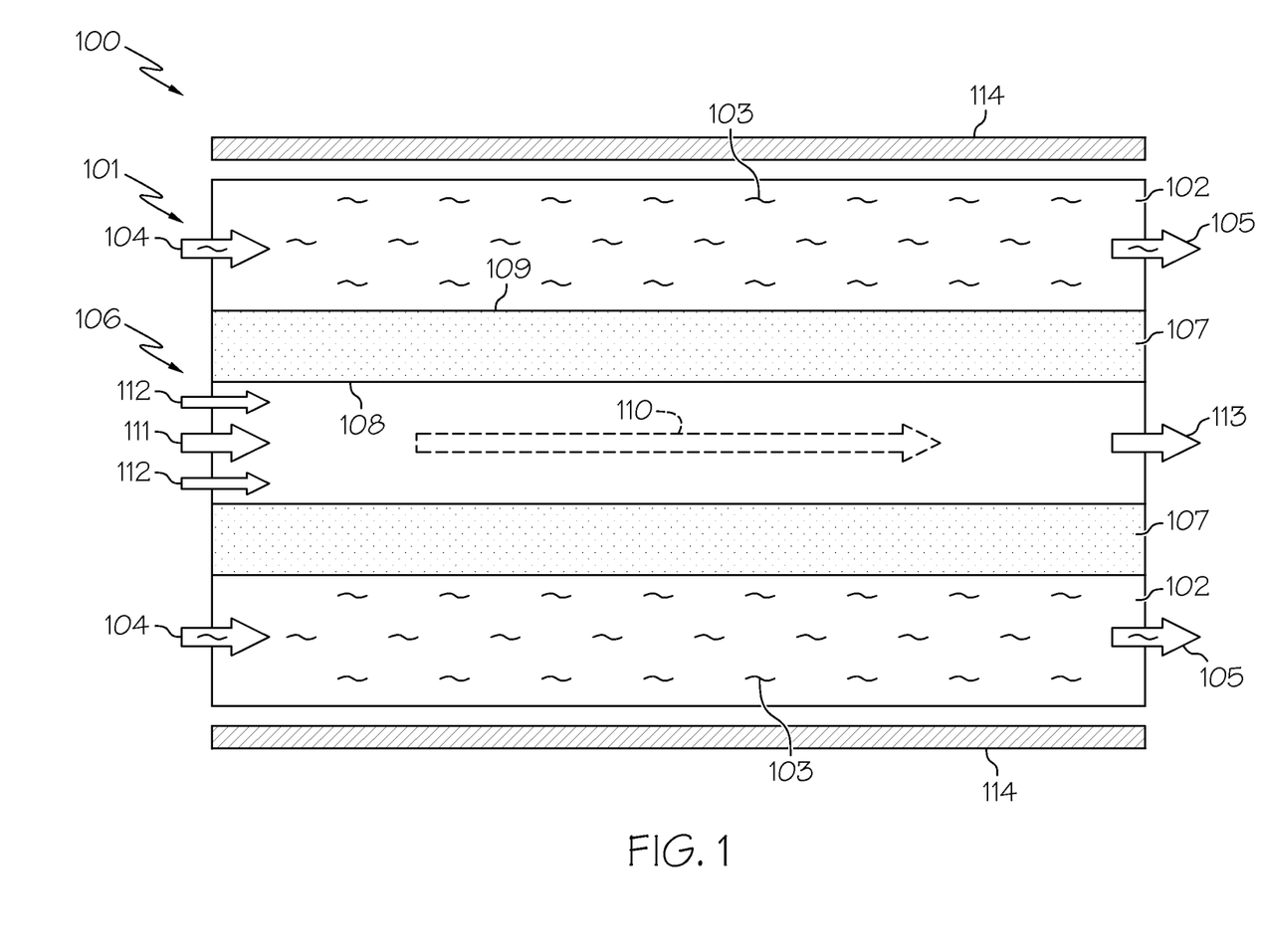
FIG. 1 depicts a schematic of an exemplary continuous droplet generator according to one or more embodiments illustrated and described herein.
Figure 2:
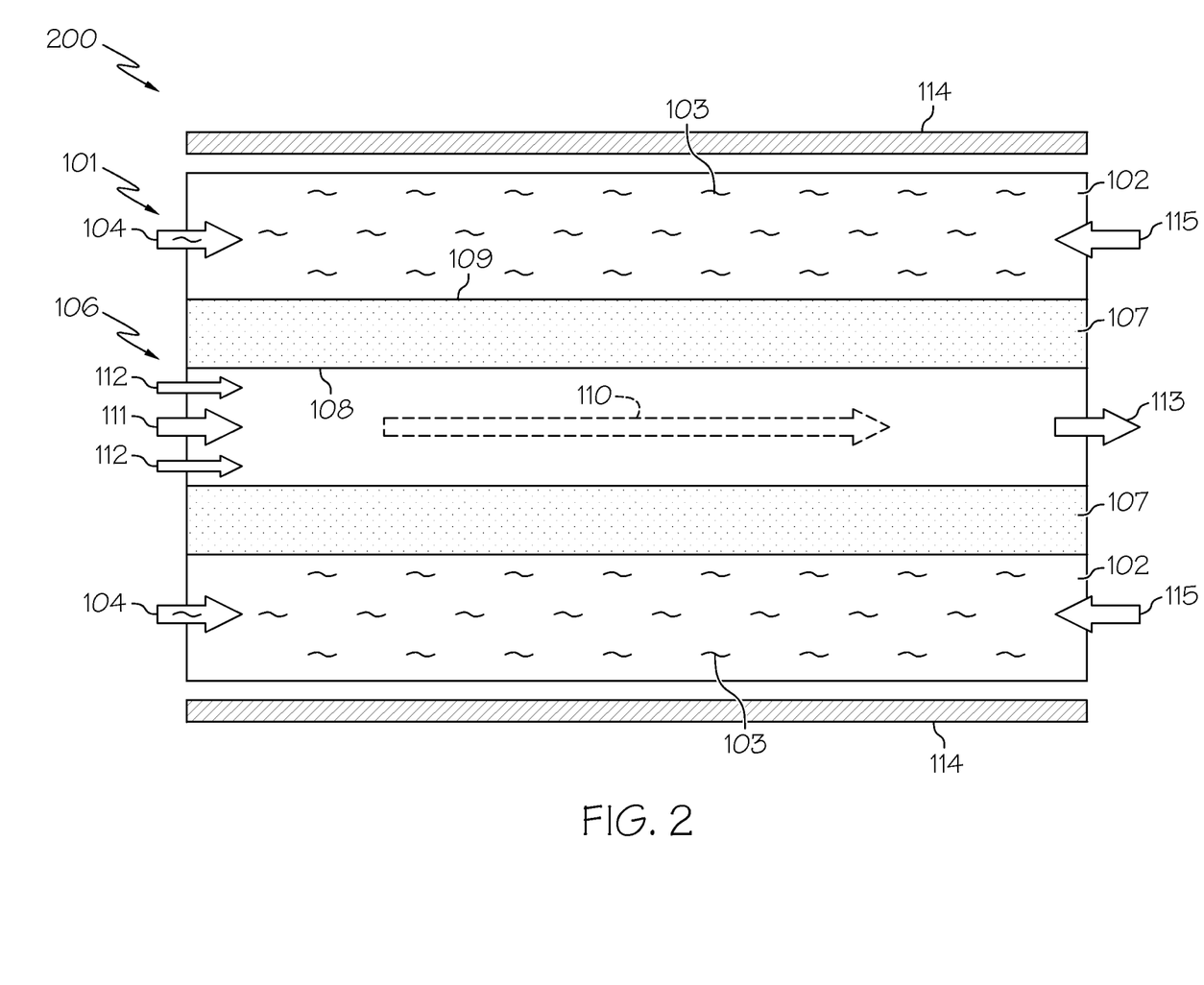
FIG. 2 depicts a schematic of an exemplary continuous droplet generator according to one or more embodiments illustrated and described herein.
Figure 3:
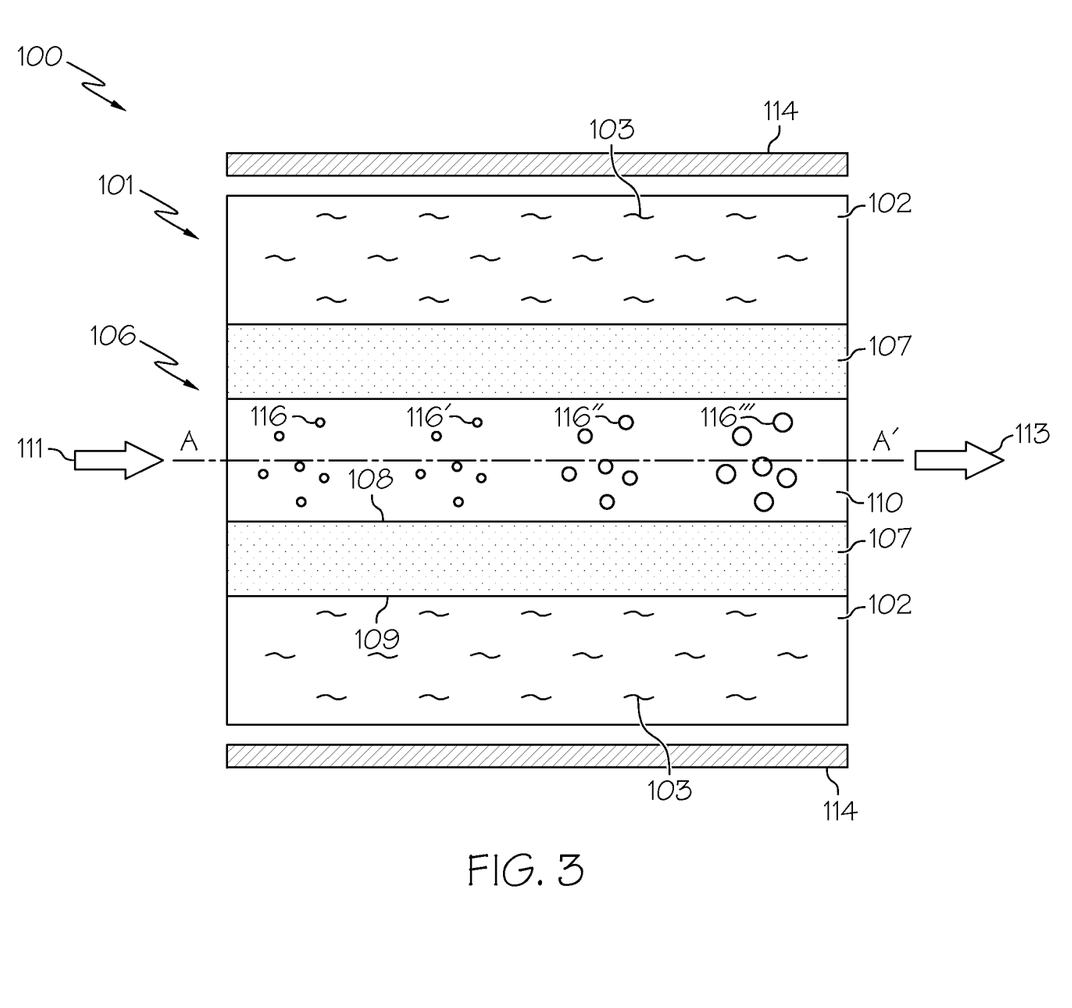
FIG. 3 depicts particle growth in an exemplary continuous droplet generator according to one or more embodiments illustrated and described herein.

Referring to FIGS. 1-3, the heater 114 may surround the outside of the outer housing 101 to provide thermal energy for phase changing the working liquid 103 into vapor and producing a temperature gradient that is perpendicular to the direction of the particle-containing gas flow 110. The heater 114 may comprise a heating element that generates heat upon receiving a control electrical current or voltage. Although FIGS. 1-3 illustrate the heater 114 as surrounding the exterior of the outer housing 101, other configurations are also possible. For example, the heater 114 may be configured to surround the outer wall surface 109 of the evaporation-condensation tube 106, such as a wire made of a heating element material that is wrapped around the evaporation-condensation tube 106. Two leads of the heater 114 may pass through the outer housing 101 and be coupled to a power source (not shown). The length of the heater 114 can be adjusted such that it provides heat to the entire length or a portion of the outer housing 101 or the evaporation-condensation tube 106 to provide optimal operating conditions.

Figure 6A:
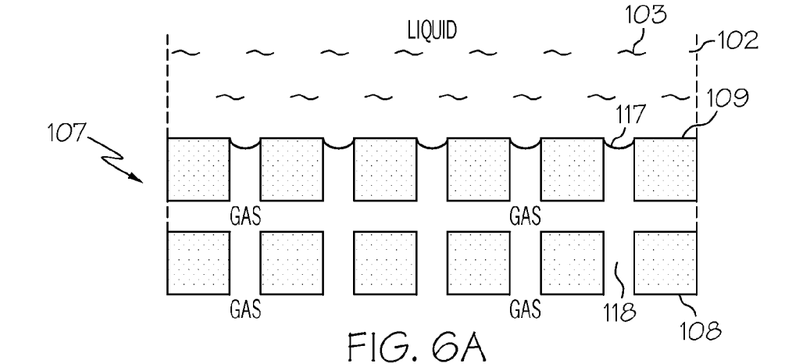
FIG. 6A depicts a schematic of a liquid-vapor interface of a non-wetting evaporation-condensation tube wall having a first porosity according to one or more embodiments shown and described herein.
Figure 6B:
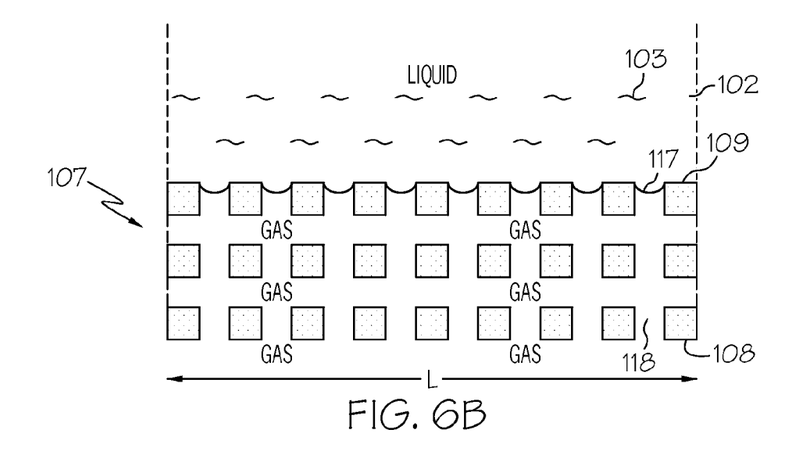
FIG. 6B depicts a schematic of a liquid-vapor interface of a non-wetting evaporation-condensation tube wall having a second porosity according to one or more embodiments shown and described herein.

Referring to FIGS. 6A and 6B, the evaporation-condensation tube wall 107 may be constructed from one or more hydrophobic layers that comprise nano- or microsize pore structures having a plurality of pores 118. Pore structure is defined herein as a porous solid permeated by an interconnected network of pores filled with liquid or gas. Porosity, a physical property of pore structure, is defined as a fraction of voids over the total volume as a percentage between 0 and 100%. The pore structures should provide for an evaporation-condensation tube wall 107 having a high pore-to-surface ratio together with a small pore diameter to enhance the evaporation rate and induce high capillary force within the evaporation-condensation tube 106. The pore structures may consist of randomly propagating pores within the one or more layers, or may be symmetrical or straight ducts depending on the fabrication process and the type of material chosen for the evaporation-condensation tube 106. It should be understood that the pores 118 and overall pore structure of the evaporation-condensation tube wall 107 depicted in FIGS. 6A and 6B are for illustrative purposes only, as the pores 118 may travel in any direction and have many different sized diameters. Exemplary hydrophobic materials having a nano- or microsize pore structure may include, but are not limited to cellulose, cellulose acetate, polysulfone, polyvinylidene difluoride, Si, SiO$_2$ and its composite.

Unlike wetting wall-based particle condensation devices in which a wetted wick liner is saturated, embodiments described herein provide a non-wetting inner wall surface 108 that prevents liquid from entering the evaporation-condensation tube 106 and disrupting the particle-containing gas flow 110. In wetting wall devices, liquid may enter the tube due to external forces such as shock or may only operate effectively in a upward orientation. Further, entering particles may directly contact the working liquid. As illustrated in FIGS. 1-3, 6A and 6B, and described in detail below, the inner wall surface 108 is described as non-wetting because the pore diameter of the pores within the evaporation-condensation tube 106 are of a small size (e.g., between about 1 nanometer and about 1000 micrometers) such that a liquid-gas interface (e.g., interface 117) forms within the pores 118 at or proximate the outer wall surface 109. Therefore, the working liquid 103 is not free to directly contact particle-containing gas flow 110. As described in more detail below, the thermal energy provided by the heater 114 changes the working liquid into a vapor that travels through the pore structure to increase the humidity within the evaporation-condensation tube 107 and the particle-containing gas flow 110, thereby causing growth of the particles by condensation.

The operation and operational parameters of the continuous droplet generators will now be described. One issue regarding the design of a continuous droplet generator may be the sustainability of supersaturated conditions inside the evaporation-condensation tube that facilitate particle growth by condensation. The saturation ratio (or Supersaturation) may be defined by:

$$SR = \frac{p_v}{p_{sat}(T)}, \quad \text{Eq. (1)}$$

where $p_v$ is partial pressure of vapor, $p_{sat}(T)$ is saturation pressure of vapor at temperature T. For water, the saturation ratio may be further defined by the ratio of the actual specific humidity to the specific humidity of saturated at the same temperature. If the resulting value is less than one, the condition is considered unsaturated; if the resulting value is equal to one, the condition is saturated; and if the resulting value is greater than one, the condition is considered supersaturated. Supersaturation means that vapor exceedingly exists at a given temperature. Exposure of particles to supersaturated vapor results in vapor deposition in the form of absorption coupled with vapor condensation causing the droplets to grow about the particles.

The efficacy of the continuous droplet generator to nucleate particles depends upon the flow field and the thermal and mass transport inside evaporation-condensation tube. The rate of growth of droplets induced by a particle when the initial particle size is less than the mean gas free path is governed by the rate of random molecular collision of vapor molecules. The rate of collisions may be given by the kinetic theory of gases:

$$\frac{dD_p}{dt} = \frac{2M(p_v - p_d)}{\rho_p N_a \sqrt{2\pi mkT}} \text{ for } D_p < \lambda, \quad \text{Eq. (2)}$$

where M is molecular weight of working liquid, m is mass of a vapor molecule, $\lambda$, is particle-containing gas mean free path, $\rho_p$ is density of particle, t is time, k is gas constant per molecule, and Na is Avogadro's constant.

For particles larger than the gas mean free path, growth does not depend on the rate of random molecular collisions but rather on the rate of diffusion of molecules to the droplet surface. This is analogous to the coagulation of aerosol particles:

$$\frac{dD_p}{dt} = \frac{4Diff_v M(p_v - p_{sat})}{\rho_p D_p RT} \text{ for } D_p > \lambda, \quad \text{Eq. (3)}$$

Figure 4:
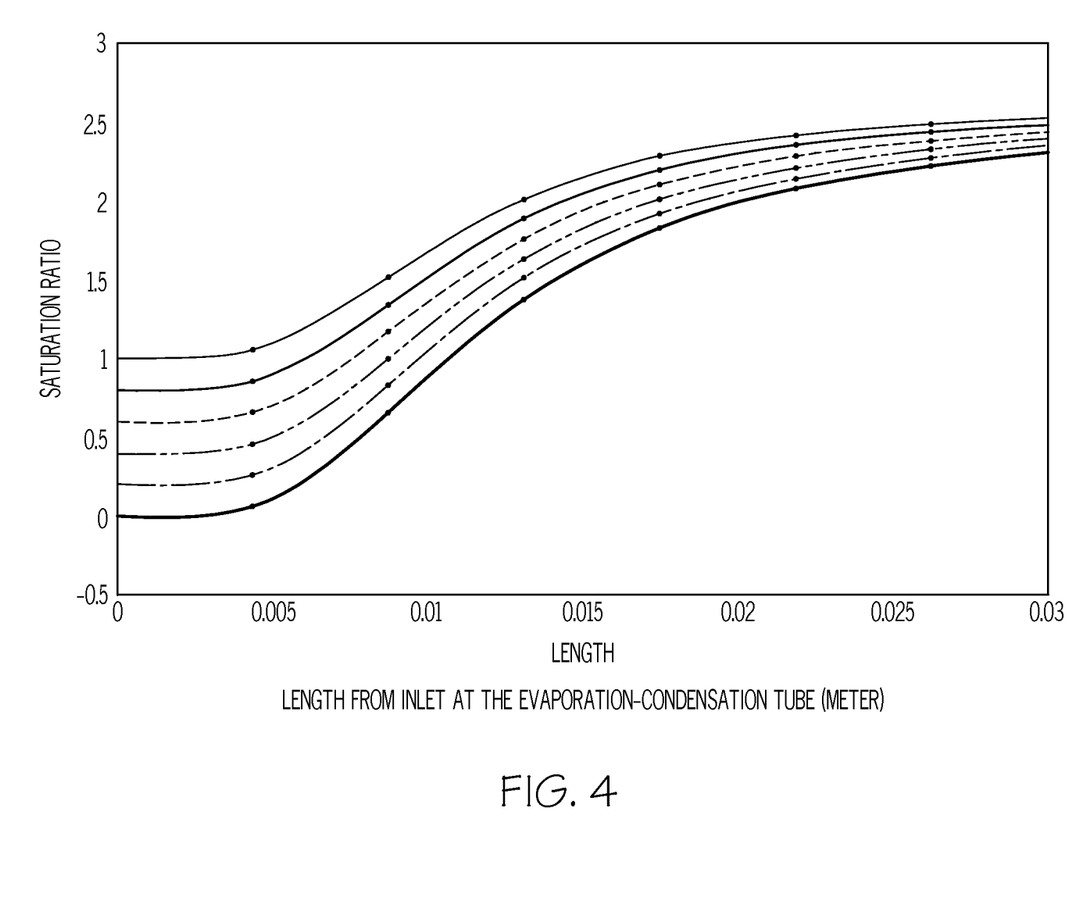
FIG. 4 depicts a graph of saturation ratio profiles for heterogeneous condensation droplet formation of the exemplary continuous droplet generator illustrated in FIG. 3 according to the inlet saturation ratio.

More detailed operation is described with respect to FIG. 4, which illustrates the theoretical increment of saturation ratio along the A-A' line of the schematic illustrated in FIG. 3. As an example, a particle-containing gas flow 110 (25° C., varied saturation ratio from 0 to 1 at particle-containing gas inlet, 0.3 liter per minute of volume flow rate, 0.12 second residence time) is continuously introduced into the gas inlet 111. Vapor that has been phase-changed from the working liquid 103 is continuously delivered from the working liquid reservoir 102 through the wall 107 of the evaporation-condensation tube 106 into the particle-containing gas flow 110 via the pore structure. The particle-containing gas flow 110 is thereby suitably humidified and saturated during the residence time in the evaporation-condensation tube 106. Heterogeneous condensation on the particles is initiated when the particle-containing gas flow 110 has a saturation ratio that is greater than one (i.e., supersaturated). The particles may grow to become droplets with a droplet diameter as provided by above droplet growth equations.

Note that the saturation ratios of FIG. 4 corresponding to non-wetting inside wall conditions rather than wetted inside wall conditions. The supplying vapor for supersaturation is phase-changed where the working liquid contacts the outer surface wall 109. Grown heterogeneous droplets may then be detected by suitable analysis devices including an optical particle detection or analysis system (not shown).

By using a non-wetting nano- or micro-size pore structure, the evaporation-condensation tube 106 used for the particle condensation device 100 can be advanced for acquiring the certain level of supersaturation ratio due to increased evaporation rate per unit projected area. The evaporation rate per unit projected area of pore structure can be greater than that of a wetted surface if the averaged pore size is small enough and the porosity is high enough.

Figure 5:
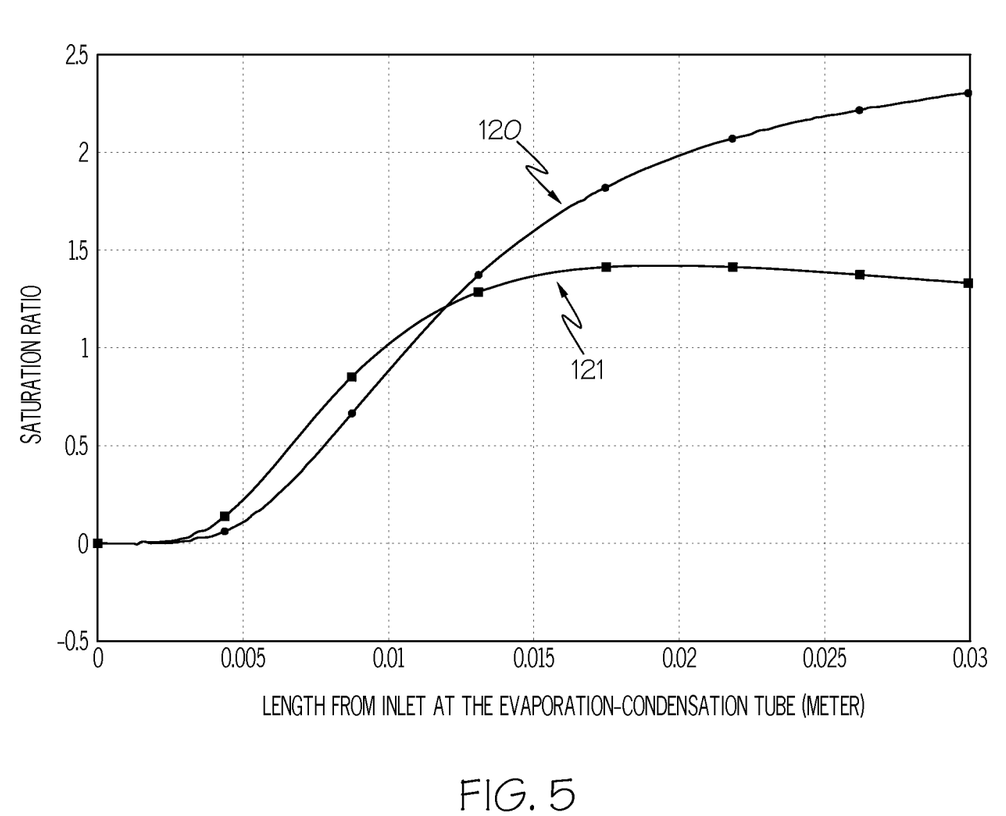
FIG. 5 depicts a graph of the saturation ratio profile along a centerline the exemplary continuous droplet generator illustrated in FIG. 3 according to one or more embodiments illustrated and described herein.

FIG. 5 illustrates water vapor saturation ratio profiles along line A-A' of FIG. 3 that result when an exemplary incoming particle-containing gas flow is at about 25° C. and about 0% relative humidity with 0.3 liter per minute of volume flow rate within pore structured non-wetting and wetted inner surface of a 3-centimeter evaporation-condensation tube 106. The pore structure of the non-wetting evaporation-condensation tube 106 used in the example of FIG. 5 has an average pore diameter of about 400 nanometers and a porosity of approximately 70%. The larger value of the saturation ratio illustrates the higher relative humidity at the corresponding length from the gas inlet 111. The working liquid of this example at about 50° C. The saturation ratio profiles in FIG. 5 are calculated using related momentum, energy, and mass transfer equations.

Contour 120 corresponds to a saturation ratio profile resulting from evaporation of the working liquid at the outer surface of the pore-structured (and non-wetting) evaporation-condensation tube. Contour 121 results from a wetted inner surface where the working liquid evaporates. As shown in FIG. 5, the saturation ratio of the non-wetting inner surface increases faster and is greater at the downstream than that of the wetted inner surface. It should be understood that embodiments described herein are not limited to the above example. In other embodiments, the porosity may be between 1 and 95 volume percentages.

The enhanced saturation profile provided by a non-wetting pore structure may be explained by an enlarged evaporation area induced by the curved shape of interface 117 which is functioning as an evaporation area. Under a nuclei heterogeneous condensation process of continuous incoming particle-containing gas flow, the droplet growth by condensation relies upon vapor supply governed by the evaporation rate of the working liquid at the wall of evaporation-condensation tube. The evaporation rate of the working liquid is proportional to the evaporation area, mass transfer coefficient, and the difference of partial vapor pressure between the evaporation surface and that of particle-containing gas flow:

$$\dot{m}_{evp} = h_{mass} \cdot A_{evp} \cdot \left( \frac{p_{sat}}{p_{tot}} - \frac{p_{sat,\infty}}{p_{tot,\infty}} \right), \quad \text{Eq. (4)}$$

where $\dot{m}_{evp}$ is the evaporation rate of the working liquid, $h_{mass}$ is the mass transfer coefficient equivalent to the value of the total concentration times the mass diffusivity, $A_{evp}$ is the evaporation area, $p_{sat}$ is the saturated vapor pressure at the surface of evaporation area, $p_{tot}$ is the total pressure at the surface of evaporation area, $p_{sat,\infty}$ is the saturated vapor pressure of particle-containing gas flow, and $p_{tot,\infty}$ is the total pressure of particle-containing gas flow.

As mentioned above, FIGS. 6A and 6B illustrate cross-sectional views of two non-wetting pore structured walls 107 having different porosity. FIGS. 6A and 6B also illustrate the interface 117 formed at the outer wall 109 surface of the non-wetting evaporation-condensation tube wall 107 having a pore structure. The estimated porosities are about 46% and about 70% for the pore structures of FIGS. 6A and 6B, respectively. The pore diameter and wall thickness are the same for both pore structures of FIGS. 6A and 6B.

Non-wetting walls of particular embodiments form a convex-shaped interface of liquid, gas, and pores at the outer wall surface of the evaporation-condensation tube due to the capillary force and pressure difference between the working liquid and the particle-containing gas flow. The interface acts as the evaporation surface where the working liquid is phase-changed by the thermal energy provided by the heater. When the pressure of the working liquid is higher than that of the vapor pressure, the interface is convex-shaped as illustrated in FIGS. 6A and 6B. Conversely, a concave-shape interface is formed when the pressure of working liquid is lower than vapor pressure or pressure of the particle-containing gas flow.

The interface has a curved surface that is induced by the capillary force balancing the pressure difference between the working liquid and the vapor that is phase-changed from the working liquid. Due to the curved shape of the interface, the area of the interface is greater than that of a flat surface. The greater area of the curved surface results in a greater evaporation area which thereby delivers more phase-changed vapor during evaporation process than that of flat wetted surface. Consequently, the saturation ratio may be greater. For example, the total area of the interface of the pore structure illustrated in FIG. 6B may be about 40% greater than that of fully wetted surface, which can be represented by the length of the pore structure (L). The total interface of the non-wetting outer wall surface 109 of 6B is the liquid gas interface 117 at each pore 118 and does not include the solid surfaces. By the combination of small pore sizes and high porosity, the evaporation area of pore structure may therefore be greater than that of fully wetted surface. This enhanced performance may be caused by the increase of the effective evaporation area. By increasing the effective evaporation area with a non-wetting, pore structure surface, the overall length of the condensation-evaporation tube may be significantly reduced to yield a continuous droplet generator that may be comfortably worn by a user.

Figure 7:
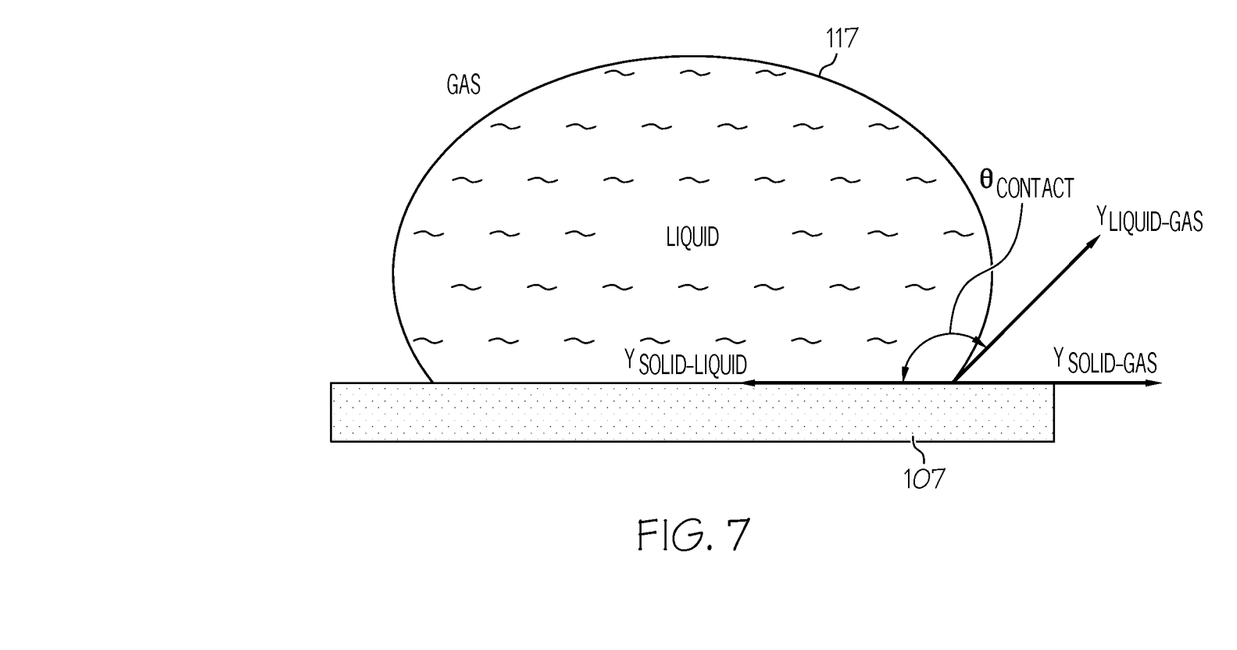
FIG. 7 depicts a schematic of a static contact angle of a droplet on a non-wetting wall of an evaporation-condensation tube.

In addition to an increased evaporation rate per unit projected area, nano- or micro-size pore structures may also provide additional functionality when combined with non-wetting characteristics presented in FIGS. 6A, 6B and 7. If the surface of the evaporation-condensation tube wall 107 is made of a hydrophobic material as described above, the static contact angle will be greater than 90° as illustrated in FIG. 7. The thermodynamic equilibrium state of a liquid droplet on the surface of the wall of evaporation-condensation tube 107 may be defined by:

$$0 = \gamma_{solid-liquid} - \gamma_{solid-gas} - \gamma_{liquid-gas} \cdot \theta_{static-contact} \quad \text{Eq. (5)}$$

Where γ is the surface tension and $\theta_{static-contact}$ is the static contact angle.

When the pressure of the working liquid 103 is different from that of the vapor or gas, the interface 117 forms a curved shape in order to retain its position in a capillary structure such as the pore structure illustrated in FIGS. 6A and 6B. The pressure difference across the interface 117 between working liquid 103 and the gas can be balanced by the capillary pressure (capillary force per projected area) which is naturally generated by the action of surface tension and contact angle. Depending on the pressure difference at the curvature, the capillary pressure is adjusted spontaneously by varying its dynamic contact angle. The capillary force increases proportionally with respect to the surface tension of the working liquid and inversely proportional with respect to the diameter of the capillary. The pore structure may be considered as a capillary as defined by:

$$p_{capillary} = p_{workingliquid} - p_{gas} \quad \text{Eq. (6)}$$
$$= \frac{2 \cdot \gamma_{liquid-gas} \cdot \cos(\theta_{dynamic-contact})}{r},$$

where $\theta_{dynamic-contact}$ is dynamic contact angle and r is radius of pore.

Due to the non-wetting characteristics of the evaporation-condensation tube wall 107, the capillary force is directed toward the working liquid 103 at the higher pressure and not toward the particle-containing gas flow 110 at the lower pressure. Because the evaporation-condensation tube 106 comprises a hydrophobic material, the liquid-gas interface 117 remains substantially at the outer wall surface 109. Conversely, if the material were hydrophilic, the interface would occur at the inner wall surface 108 due to wicking, thereby forming a wetted wall. The working liquid 103 cannot permeate through to the inner wall surface 108 and into the evaporation-condensation tube 106 even though the pressure of the working liquid is higher than the pressure of the particle-containing gas flow 110. Therefore, the capillary force acts as a retention force when the externally occurring force is applied to the generator. In this manner, embodiments of the present disclosure continue to effectively operate despite external forces such as sudden acceleration, contact forces on the outer housing, changes of the device orientation and the like because the working liquid 103 remains within the working liquid reservoir 102 rather than entering into the evaporation-condensation tube 106. For example, embodiments may withstand forces characterized by up to about 2π/10 rad/sec of angular velocity and/or up to ±980 m/sec² acceleration.

As an example and not a limitation, an embodiment has an evaporation-condensation tube with a maximum capillary pressure (defined as capillary force per unit projected area) of about 764,500 Pascal at the interface, where the working liquid is water at about 20° C., the dynamic contact angle is about 180°, and the pore diameter is about 100 nm. As a result, if the external pressure (external force per unit projected area) of less than that of the maximum capillary pressure is applied to the continuous droplet generator of this embodiment, the working liquid water will not permeate to the inside of wall of evaporation-condensation tube. Consequently, the working liquid is prevented from leaking into the inside of evaporation-condensation tube during droplet generation.

Figure 8:
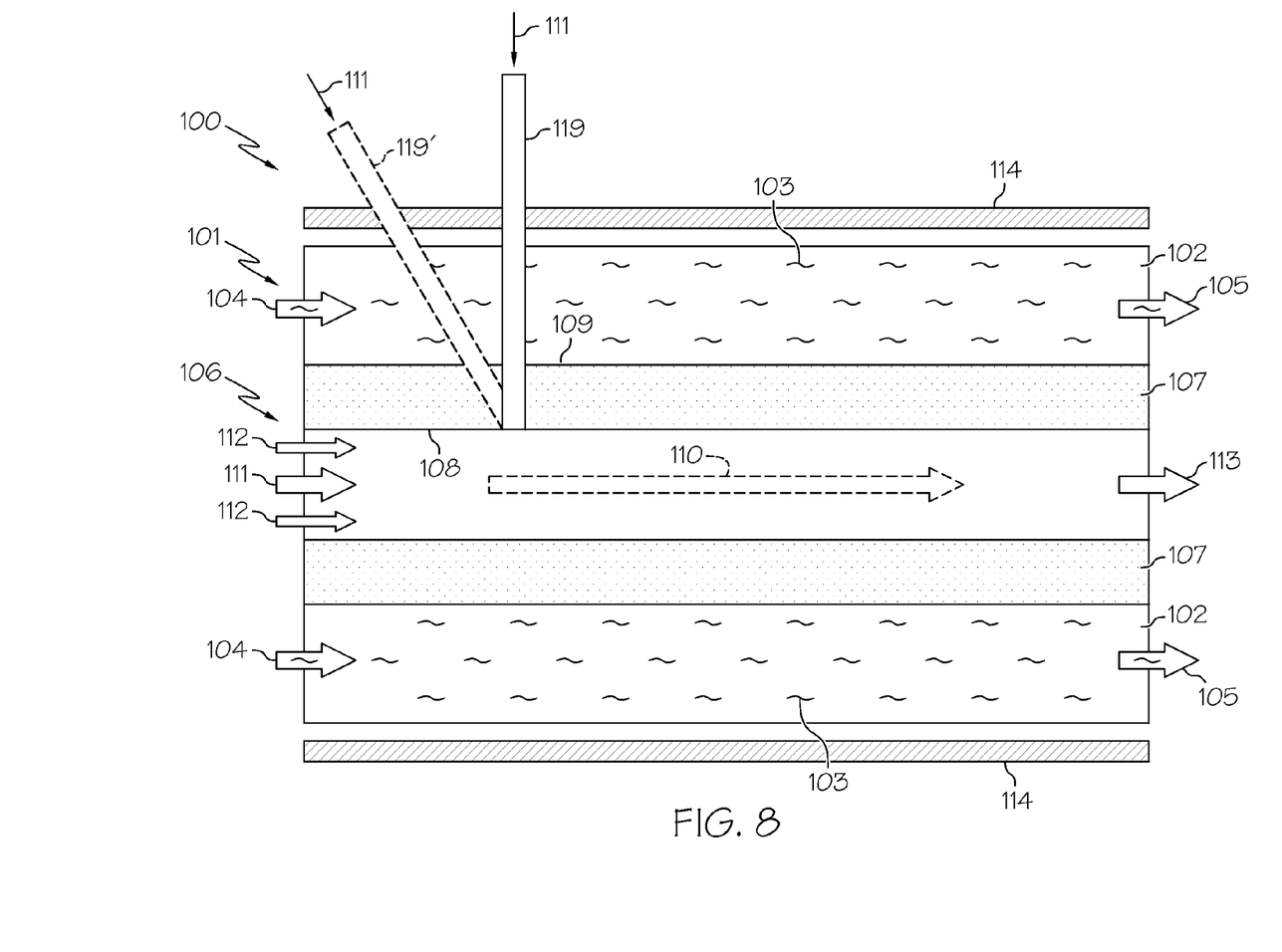
FIG. 8 depicts a schematic of an exemplary continuous droplet generator having a swirl flow gas inlet according to one or more embodiments shown and described herein.
Figure 9:
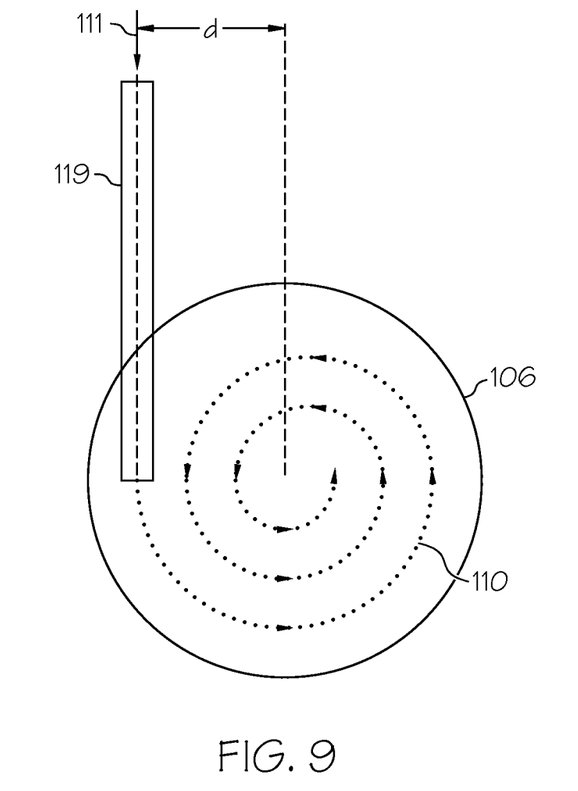
FIG. 9 depicts a schematic of a swirl flow inside of a evaporation-condensation tube according to one or more embodiments shown and described herein.

FIG. 8 illustrates an embodiment having a swirl flow gas inlet 119/119' positioned and configured to introduce a particle-containing air flow (or a filtered, particle-free air flow) having a swirl pattern within the evaporation-condensation tube 106 (see FIG. 9). The embodiment is similar to those described above except for the configuration of the swirl flow gas inlet 119/119'. As illustrated in FIG. 8, the sample particle-containing gas flow may be introduced into the evaporation-condensation tube 106 via the swirl flow gas inlet 119/119', which may be oriented at a certain angle ranging from 0 degrees to 90 degrees to the axis of evaporation-condensation tube 106. The swirl flow gas inlet 119/119' may be offset from the symmetric axis of the evaporation-condensation tube 106 by an offset distance d for creating a swirl flow as illustrated in FIG. 9. The evaporation-condensation tube 106 may have a substantially cylindrical tube configuration (or other geometric configuration) made of a non-wetting, hydrophobic material capable of delivering vapor as described above. In one embodiment, one end of the evaporation-condensation tube 106 is closed and the other is open and connected to a particle detector, such as an optical particle detector. The air stream containing small particles to be measured is introduced tangentially or at a certain angle to the axis of tube via the swirl flow gas inlet 119/119'.

The entering particle-containing gas flow 110 acquires a rotating motion moving along the tube, and thus the swirl-like flow is induced as illustrated in FIG. 9. This swirling inlet flow may reduce the residence time needed for particle growth. Supersaturation is instantaneously created in a small region near the inlet port by the turbulent mixing of the cold aerosol flow (i.e., the particle-containing gas flow 110) with the hot saturated condensable vapor within the evaporation-condensation tube 106. The swirl flow gas inlet 119/119' enhances this mixing of incoming aerosol flow with the hot vapor evaporated from the outer wall surface 109. Additionally, the particle-containing gas flow 110 that is forced into a swirling motion may allow the gas velocity profile inside of the evaporation-condensation tube to be more consistent and predictable than the use of a straight turbulent impinging jet. Therefore, velocity fluctuations in the mixing region may be lower and thus a more stable supersaturation profile may be obtained.

Further, the relative velocity of the swirling particle-containing gas flow 110 to the inner surface of tube increases, and a turbulent boundary layer is more likely to be created near the wall 107. Therefore, a much larger mass transfer rate may be obtained than for a laminar diffusive flow, thereby enhancing the evaporation rate per unit projected area. Consequently, the attainable degree of supersaturation of the particle-containing gas flow 110 may be increased such that a shorter and smaller continuous droplet generator device may be manufactured. The degree of swirling velocity or turbulent fluctuations may be controlled by changing the variables of swirl flow gas inlet 119/119' such as the inner diameter of the inlet, the angle relative to the axis of evaporation-condensation tube, offset distance from the symmetric axis of the evaporation-condensation tube, and the inlet flow rate.

The mixing portion of this embodiment is followed by the heating portion within the evaporation-condensation tube 106 for enhancing the particle growth. In the heated region, the mixed gas flow is stabilized and subsequent condensational growth of particles occurs. The swirling motion of the gas flow continues to decay downstream of the region of the initial mixing due to the shear from the wall 107 of the evaporation-condensation tube 106. That is, the turbulent dissipation occurs moving along the tube 106 and thus the flow at the downstream portion of the tube 106 is stabilized and becomes close to laminar. The more stable flow near the exit of the evaporation-condensation tube 106 may reduce the occurrence of errors by an optical particle counter.

Other swirl type embodiment configurations are also possible. For example, one embodiment comprises both a swirl flow gas inlet 119/119' a straight gas inlet 111 as illustrated in FIG. 9. The gas flow introduced via the straight gas inlet 111 may enter the evaporation-condensation tube 106 as described above. In some embodiments, the gas flow entering from the straight gas inlet 111 may first enter a saturator/preconditioner tube (not shown) prior to entering the evaporation-condensation tube by which the gas flow may be conditioned to a specified temperature and saturation ratio before mixing with the swirling inlet flow. The particle-containing gas flow may enter from either the straight gas inlet 111, the swirl flow gas inlet 119/119' or both.

It should now be understood that embodiments of the present disclosure may provide continuous droplet generator devices that are capable of being worn by a user and may withstand external forces. The wall of the evaporation-condensation tubes described herein may have non-wetting characteristics with nano- and micro-scale pore diameters. The resulting capillary force enables embodiments to operate at any orientation while also being subjected to externally occurring forces including, but not limited to, shaking, vibration, mechanical shock, movement, and rotation.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component. It is also noted that some non-critical structural details of the laser source subassembly, e.g., lead lines, electrical connections, etc., have been omitted from the illustrations presented herewith to preserve clarity but will be readily apparent to those familiar with laser diode design and assembly.

For the purposes of describing and defining the present disclosure it is noted that the terms "substantially," "approximately" and "about" are utilized herein to represent the inherent degree of uncertainty that may be attributed to any quantitative comparison, value, measurement, or other representation. The terms "substantially," "approximately" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

What is claimed is:

1. A continuous droplet generator comprising:
    an outer housing defining a working liquid reservoir configured to maintain a working liquid;
    at least one heater configured to change the phase of the working liquid; and
    an evaporation-condensation tube positioned at least partially within the outer housing, wherein the evaporation-condensation tube comprises:
        a gas inlet configured to receive a particle-containing gas flow;
        a gas outlet configured to export generated condensed droplets;
        a wall;
        an outer wall surface configured to be in contact with the working liquid; and
        an inner wall surface configured to be in contact with the particle-containing gas flow;
    wherein the continuous droplet generator is operable to transport vapor to the particle-containing gas flow through the evaporation-condensation tube by diffusion and vapor pressure difference, thereby increasing a relative humidity of the particle-containing gas flow to grow particles within the particle-containing gas flow by nuclei heterogeneous condensation.

2. The continuous droplet generator as claimed in claim 1, wherein the working liquid comprises water, an organic compound in which a hydroxyl group (—OH) is bound to a carbon atom of an alkyl or substituted alkyl group, or combinations thereof.

3. The continuous droplet generator as claimed in claim 1, wherein the gas inlet further comprises at least one gas inlet positioned relative to an axis of the evaporation-condensation tube at an angle between about 0 degrees and 90 degrees.

4. The continuous droplet generator as claimed in claim 3, wherein the angle of the gas inlet is such that the particle-containing gas flow comprises a swirl flow upon entry into the evaporation-condensation tube.

5. The continuous droplet generator as claimed in claim 1, wherein:
    the gas inlet comprises at least one swirl flow gas inlet and a straight flow gas inlet;
    the straight flow gas inlet is configured to introduce the particle-containing gas flow or a filtered gas flow that is along an axis of the evaporation-condensation tube; and
    the swirl flow gas inlet is angled relative to the axis of the evaporation-condensation tube to introduce a swirl flow of the particle-containing gas flow or the filtered gas flow.

6. The continuous droplet generator as claimed in claim 1, wherein the heater is configured to produce a temperature gradient perpendicular to a traveling direction of the particle-containing gas flow.

7. The continuous droplet generator as claimed in claim 1, wherein the heater surrounds at least a portion of an outer surface of the outer housing.

8. The continuous droplet generator as claimed in claim 1, wherein the heater surrounds at least a portion of the outer wall surface of the evaporation-condensation tube.

9. The continuous droplet generator as claimed in claim 1 wherein a temperature of the working liquid reservoir is greater than a temperature of particle-containing gas flow.

10. The continuous droplet generator as claimed in claim 1 wherein the heater is operable to phase change the working liquid into vapor by evaporation at the outer wall surface of the evaporation-condensation tube.

11. The continuous droplet generator as claimed in claim 1, wherein the heater is operable to phase change the working liquid into vapor by evaporation within the wall of the evaporation-condensation tube.

12. The continuous droplet generator as claimed in claim 1, wherein a static pressure of the working liquid reservoir is greater than a static pressure of the particle-containing gas flow.

13. The continuous droplet generator as claimed in claim 1, wherein the particle-containing gas flow comprises air, nitrogen, or combinations thereof.

14. The continuous droplet generator as claimed in claim 1, wherein the wall of the evaporation-condensation tube comprises a pore structure operable to provide a path for the vapor from the working liquid reservoir to the particle-containing gas flow.

15. The continuous droplet generator as claimed in claim 14, wherein the pore structure provides an outer wall surface evaporation area that is greater than an evaporation area of a wall having no pore structure.

16. The continuous droplet generator as claimed in claim 14 wherein:
the pore structure forms an interface of the working liquid and the vapor; and
the pore structure provides a capillary force at the interface that is greater than an externally applied force.

17. The continuous droplet generator as claimed in claim 16, wherein a thickness of the wall of the evaporation-condensation tube is between about 0.5 micrometer and about 5 centimeters.

18. The continuous droplet generator as claimed in claim 16, wherein the inner and outer wall surfaces of the evaporation-condensation tube are non-wetting.

19. The continuous droplet generator as claimed in claim 16, wherein a static contact angle of the working liquid on the inner or outer wall surface of the evaporation-condensation tube is at least about 90 degree at about 20° C.

20. The continuous droplet generator as claimed in claim 1, wherein the evaporation-condensation tube comprises a hydrophobic material.

21. The continuous droplet generator as claimed in claim 1 further comprising a particle-free gas inlet port operable to introduce a continuous particle-free gas flow coaxially surrounding the particle-containing gas flow within the evaporation-condensation tube.

22. The continuous droplet generator as claimed in claim 21, wherein the particle-free gas flow comprises air, nitrogen, or combinations thereof.

23. The continuous droplet generator as claimed in claim 1, wherein the outer housing further comprises a working liquid inlet and working liquid outlet operable to circulate the working liquid through the working liquid reservoir.

24. The continuous droplet generator as claimed in claim 1, wherein the outer housing further comprises working liquid inlet operable to provide the working liquid to the working liquid reservoir.

25. The continuous droplet generator as claimed in claim 1, wherein the outer housing further comprises one or more ports operable to regulate the vapor pressure of the working liquid reservoir.

26. The continuous droplet generator as claimed in claim 25, wherein the port is further operable to prevent the working liquid from flowing out of the working liquid reservoir.

27. The continuous droplet generator as claimed in claim 1, wherein the gas outlet is configured to be coupled to one or more sensing devices.

28. The continuous droplet generator as claimed in claim 27, wherein the sensing device comprises one or more of the following: a particle collector, a particle counter, a particle analyzer, a chemical analyzer, a bio-marker analyzer, and a bio-species analyzer.

29. A method of increasing a relative humidity level of a particle-containing gas flow to generate continuous droplets, the method comprising:
passing the particle-containing gas flow through an evaporation-condensation tube comprising a hydrophobic material having a pore structure, wherein at least an inner wall surface of the evaporation-condensation tube is non-wetting;
applying a working liquid to an outer wall surface of the evaporation-condensation tube; and
heating the working liquid to initiate a phase change of the working liquid to a vapor, wherein the pore structure of the hydrophobic material is operable to transport the vapor to the particle-containing gas flow.

30. The method as claimed in claim 29, wherein the pore structure provides an outer wall surface evaporation area that is greater than an evaporation area of a wall having no pore structure.

31. The method as claimed in claim 29, wherein the hydrophobic material comprises a porosity between about 1 and about 95 volume percentages.

32. The method as claimed in claim 29, wherein the hydrophobic material comprises an average pore size between about 1 nanometer and about 1000 micrometers.

33. The method as claimed in claim 29, wherein the hydrophobic material comprises a thickness between about 0.5 micrometer and about 5 centimeters.

34. The method as claimed in claim 29, wherein a static contact angle of the working liquid on the inner or outer wall surface is at least about 90 degrees at about 20° C.

35. The method as claimed in claim 29, wherein:
the pore structure forms an interface of the working liquid and the vapor; and
the pore structure provides a capillary force at the interface that is greater than an externally applied force.

36. The method as claimed in claim 29, wherein the continuous droplet generation is independent of an orientation of the evaporation-condensation tube.

37. The method as claimed in claim 29, wherein the continuous droplet generation is independent of an externally applied force characterized by up to about $2\pi/10$ rad/sec angular velocity.

38. The method as claimed in claim 29, wherein the continuous droplet generation is independent of an externally applied force characterized by up to ±980 m/sec$^2$ acceleration.

39. A continuous droplet generator comprising:
an outer housing defining a working liquid reservoir configured to maintain a working liquid;
at least one heater configured to change the phase of the working liquid; and
an evaporation-condensation tube positioned at least partially within the outer housing, wherein the evaporation-condensation tube comprises:
a gas inlet configured to receive a particle-containing gas flow;
a gas outlet configured to export generated condensed droplets;
an outer wall surface configured to be in contact with the working liquid; and
an inner wall surface configured to be in contact with the particle-containing gas flow;
wherein:
the evaporation-condensation tube comprises a hydrophobic material having a pore structure operable to provide a capillary force such that the continuous droplet generator operates independent of an orientation of the evaporation-condensation tube and of an externally applied force characterized by up to about ±980 m/sec$^2$ or about $2\pi/10$ rad/sec angular velocity; and the continuous droplet generator is operable to transport vapor to the particle-containing gas flow through the evaporation-condensation tube by diffusion and vapor pressure difference, thereby increasing a relative humidity of the particle-containing gas flow to grow particles within the particle-containing gas flow by nuclei heterogeneous condensation.

40. The continuous droplet generator as claimed in claim 39, wherein the hydrophobic material comprises a porosity between about 1 and about 95 volume percentages.

41. The continuous droplet generator as claimed in claim 39, wherein the hydrophobic material comprises an average pore size between about 1 nanometer and about 1000 micrometers.

42. The continuous droplet generator as claimed in claim 39, wherein the hydrophobic material comprises a thickness between about 0.5 micrometer and about 5 centimeters.

43. The continuous droplet generator as claimed in claim 39, wherein a static contact angle of the working liquid on the inner or outer wall surface is at least about 90 degrees at about 20° C.

* * * * *